United States Patent
Wu et al.

(10) Patent No.: US 12,278,707 B2
(45) Date of Patent: Apr. 15, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Lu Wu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 505 days.

(21) Appl. No.: 17/751,702

(22) Filed: May 24, 2022

(65) Prior Publication Data
US 2022/0286241 A1   Sep. 8, 2022

Related U.S. Application Data

(63) Continuation of application No. PCT/CN2020/125055, filed on Oct. 30, 2020.

(30) Foreign Application Priority Data

Nov. 25, 2019  (CN) .......................... 201911161946.5

(51) Int. Cl.
*H04L 1/1829* (2023.01)
*H04L 1/1867* (2023.01)
(Continued)

(52) U.S. Cl.
CPC .......... *H04L 1/1861* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

2019/0104546 A1 * 4/2019 Chendamarai Kannan ................. H04W 16/14
2019/0260515 A1 * 8/2019 Tang ..................... H04L 5/0078
(Continued)

FOREIGN PATENT DOCUMENTS

CN         104168092 A     11/2014
CN         105264988 A      1/2016
(Continued)

OTHER PUBLICATIONS

ISR received in application No. PCT/CN2020/125055 dated Feb. 1, 2021.
(Continued)

*Primary Examiner* — Diane L Lo
(74) *Attorney, Agent, or Firm* — Ascenda Law Group, PC

(57) ABSTRACT

The present disclosure provides a method and device in a node used for wireless communications. A first node receives a first signaling, receives a first signal in a first time window, and transmits a first bit block in a first radio resource block. The first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window. The above method not only saves the dynamic signaling overhead, but also avoids the impact of miss detection.

20 Claims, 5 Drawing Sheets

(51) Int. Cl.
*H04W 72/1263* (2023.01)
*H04W 72/20* (2023.01)

(52) U.S. Cl.
CPC ....... *H04L 1/1893* (2013.01); *H04W 72/1263* (2013.01); *H04W 72/20* (2023.01)

(56) References Cited

U.S. PATENT DOCUMENTS

| | | | |
|---|---|---|---|
| 2019/0349457 A1 | 11/2019 | Wu | |
| 2020/0328848 A1* | 10/2020 | He | H04L 1/1854 |
| 2021/0274327 A1* | 9/2021 | Zhao | H04L 1/1812 |
| 2021/0321346 A1* | 10/2021 | Yang | H04W 68/00 |
| 2022/0271874 A1* | 8/2022 | Behravan | H04L 1/1861 |

FOREIGN PATENT DOCUMENTS

| | | |
|---|---|---|
| CN | 107769825 A | 3/2018 |
| CN | 110234170 A | 9/2019 |
| CN | 110266450 A | 9/2019 |
| CN | 110351017 A | 10/2019 |
| WO | 2019090605 A1 | 5/2019 |

OTHER PUBLICATIONS

First Search Report of Chinses patent application No. CN201911161946.5 dated Apr. 6, 2022.

Notification to Grant Patent Right for Invention of Chinses patent application No. CN201911161946.5 dated Apr. 15, 2022.

Spreadtrum Communications Consideration on NR sidelink mode 1 resource allocation 3GPP TSG RAN WG1 #98bis R1-1910006 Sep. 30, 2019.

MediaTek Inc. Discussion on support of unicast, groupcast and broadcast 3GPP TSG RAN WG1 Meeting #94bis R1-1810452 Oct. 20, 2019.

Intel Corporation NR V2X sidelink communication in resource allocation mode-1 3GPP TSG RAN WG1 Meeting #99 R1-1912204 Nov. 9, 2019.

* cited by examiner

First bit block comprising first bit sub-block

First bit block comprising M1 bit sub-blocks

First bit sub-block being a bit sub-block in first bit block

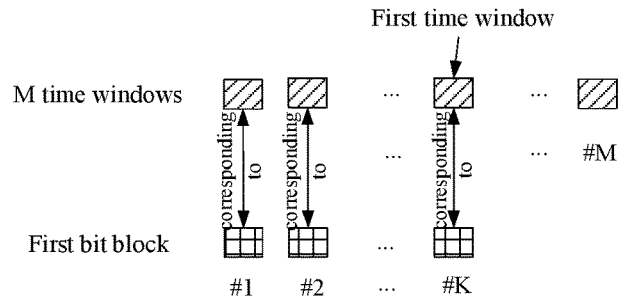
FIG. 9
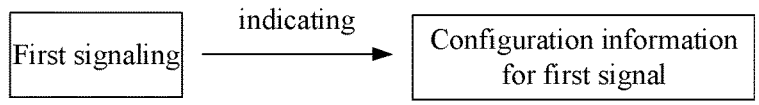
FIG. 10
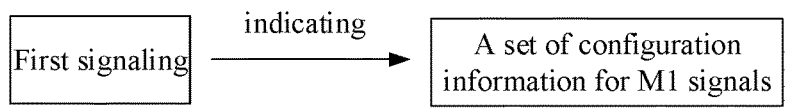
FIG. 11
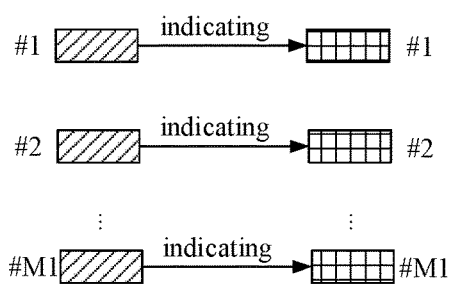
FIG. 12
M1 sub-signalings respectively being used to indicate configuration information for M1 signals
FIG. 13

METHOD AND DEVICE IN NODES USED FOR WIRELESS COMMUNICATION

CROSS REFERENCE TO RELATED APPLICATIONS

This application is the continuation of International patent application No. PCT/CN2020/125055, filed on Oct. 30, 2020, which claims the priority benefit of Chinese Patent Application No. 201911161946.5, filed on Nov. 15, 2019, the full disclosure of which is incorporated herein by reference.

BACKGROUND

Technical Field

The present disclosure relates to transmission methods and devices in wireless communication systems, and in particular to a transmission scheme and device of sidelink in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The technical Study Item (SI) of NR V2X was approved at 3GPP RAN #80 Plenary. NR V2X has agreed to support Sidelink (SL) Hybrid Automatic Repeat reQuest (HARQ) feedback for unicast and groupcast.

SUMMARY

SL HARQ of NR Rel-16 V2X does not support multiplexing. In the future V2X, SL HARQ multiplexing is a key research direction.

To address the above problem, the present disclosure provides a solution. In the description of the above problem, sidelink is illustrated as an example; the present disclosure is also applicable to other competition-based transmission scenarios, such as transmission on unlicensed spectrum, configured grant-based transmission, non-granted transmission and etc., and the present disclosure is also applicable to transmission scenarios of uplink and downlink, where similar technical effects can be achieved. Additionally, the adoption of a unified solution for various scenarios (including but not limited to sidelink, other competition-based transmission, uplink and downlink) contributes to the reduction of hardcore complexity and costs. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling;
  receiving a first signal in a first time window; and
  transmitting a first bit block in a first radio resource block;
  herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one embodiment, a problem to be solved in the present disclosure is: how to implement SL HARQ multiplexing is the problem to be solved in this application.

In one embodiment, the above method is essential in that a first bit block is a HARQ-ACK, HARQ-ACKs corresponding to data transmission in M time windows are all transmitted in a target time window, and a first bit block is a HARQ codebook supporting HARQ multiplexing. The advantage of adopting the above method is that the proposed HARQ multiplexing scheme does not need to introduce a Downlink assignment index (DAI) into SCI, and can also avoid the impact of miss detection on a size of a HARQ codebook.

In one embodiment, the above method is essential in that a first signaling is SCI, a first signal is a PSSCH, a first bit block is a HARQ-ACK, PSFCHs corresponding to PSSCHs in M time windows are all in a target time window, and a first bit block is an SL HARQ codebook supporting SL HARQ multiplexing. The advantage of adopting the above method is that the proposed HARQ multiplexing scheme does not need to introduce a DAI into SCI, and can also avoid the impact of miss detection on a size of a HARQ codebook.

According to one aspect of the present disclosure, the above method is characterized in that the first bit block comprises a positive integer number of bit sub-block(s), the first bit sub-block being a bit sub-block in the first bit block, any bit sub-block in the first bit block comprises a positive integer number of bit(s); any bit sub-block in the first bit block corresponds to one of the M time windows; the position of the first time window in the M time windows is used to determine a number of bit sub-block(s) comprised in the first bit block.

According to one aspect of the present disclosure, the above method is characterized in that the first time window is a K-th time window in the M time windows, K being a positive integer not greater than the M; the number of the bit sub-block(s) comprised in the first bit block is equal to the K.

In embodiment, the above method is essential in that K bit sub-block(s) comprised in the first bit block is(are respectively) HARQ-ACK(s) corresponding to K time window(s).

According to one aspect of the present disclosure, the above method is characterized in that the size of the first bit block is equal to a product of the size of the first bit sub-block and the number of the bit sub-block(s) comprised in the first bit block.

According to one aspect of the present disclosure, the above method is characterized in comprising:
receiving M1-1 signal(s) respectively in M1-1 time window(s);
herein, M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

In one embodiment, the above method is essential in that a first bit block is an SL HARQ codebook supporting SL HARQ multiplexing.

According to one aspect of the present disclosure, the above method is characterized in that the first signaling comprises M1 sub-signalings, the M1 sub-signalings being respectively used to indicate configuration information for the M1 signals.

According to one aspect of the present disclosure, the above method is characterized in comprising:
receiving first information;
herein, the first information is used to determine M.

The present disclosure provides a method in a second node for wireless communications, comprising:
transmitting a first signaling;
transmitting a first signal in a first radio resource block; and
receiving a first bit block in a first radio resource block;
herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

According to one aspect of the present disclosure, the above method is characterized in that the first bit block comprises a positive integer number of bit sub-block(s), the first bit sub-block being a bit sub-block in the first bit block, any bit sub-block in the first bit block comprises a positive integer number of bit(s); any bit sub-block in the first bit block corresponds to one of the M time windows; the position of the first time window in the M time windows is used to determine a number of bit sub-block(s) comprised in the first bit block.

According to one aspect of the present disclosure, the above method is characterized in that the first time window is a K-th time window in the M time windows, K being a positive integer not greater than the M; the number of the bit sub-block(s) comprised in the first bit block is equal to the K.

According to one aspect of the present disclosure, the above method is characterized in that the size of the first bit block is equal to a product of the size of the first bit sub-block and the number of the bit sub-block(s) comprised in the first bit block.

According to one aspect of the present disclosure, the above method is characterized in comprising:
transmitting M1-1 signal(s) respectively in M1-1 time window(s);
herein, M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

According to one aspect of the present disclosure, the above method is characterized in that the first signaling comprises M1 sub-signalings, the M1 sub-signalings being respectively used to indicate configuration information for the M1 signals.

According to one aspect of the present disclosure, the above method is characterized in comprising:
operating first information;
herein, the first information is used to determine M; the operating action is receiving, or, the operating action is transmitting.

The present disclosure provides a first node for wireless communications, comprising:
a first receiver, receiving a first signaling; receiving a first signal in a first time window; and
a first transmitter, transmitting a first bit block in a first radio resource block;
herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

The present disclosure provides a second node for wireless communications, comprising:
 a second transmitter, transmitting a first signaling; and transmitting a first signal in a first time window; and
 a second receiver, receiving a first bit block in a first radio resource block;
 herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one embodiment, the method in the present disclosure is advantageous in the following aspects:
 the application proposes an SL HARQ multiplexing scheme.
 the method proposed in the application does not need to introduce a DAI into SCI, so as to save the dynamic signaling overhead.
 the method proposed in the application can avoid the impact of miss detection on a size of HARQ codebook.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a number of bit sub-block(s) comprised in a first bit block according to another embodiment of the present disclosure;

FIG. 10 illustrates a schematic diagram of a size of a first bit block according to one embodiment of the present disclosure;

FIG. 11 illustrates a schematic diagram of a relation between a first signaling and a first signal according to one embodiment of the present disclosure;

FIG. 12 illustrates a schematic diagram of a relation between a first signaling and M1 signals according to one embodiment of the present disclosure;

FIG. 13 illustrates a schematic diagram of a relation between a first signaling and M1 signals according to another embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
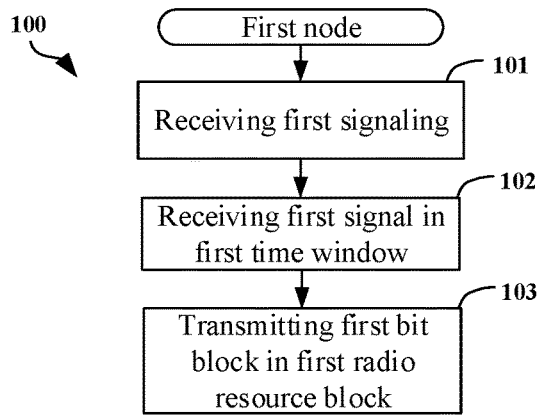
FIG. 1 illustrates a flowchart of a first signaling, a first signal and a first bit block according to one embodiment of the present disclosure.

Embodiment 1 illustrates a flowchart of a first signaling, a first signal and a first bit block according to one embodiment of the present disclosure, as shown in FIG. 1. In FIG. 1, each rectangle represents a step.

Particularly, the sequential order of steps in these boxes does not necessarily mean that the steps are chronologically arranged.

In embodiment 1, the first node in the present disclosure receives a first signaling in step 101; receives a first signal in a first time in step 102; and transmits a first bit block in a first radio resource block in step 103; herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one embodiment, the first signaling is a physical-layer signaling.

In one embodiment, the first signaling is unicast.

In one embodiment, the first signaling is groupcast.

In one embodiment, the first signaling is transmitted through sidelink.

In one embodiment, the first signaling is a Downlink Control Information (DCI) signaling.

In one embodiment, the first signaling is a Sidelink Control Information (SCI) signaling In one embodiment, the first signaling is transmitted through a sidelink control channel In one embodiment, the first signaling is transmitted through downlink In one embodiment, the sidelink control channel is a Sidelink Control CHannel (SL-CCH).

In one embodiment, the sidelink control channel is a Physical Sidelink Control CHannel (PSCCH).

In one embodiment, the first signaling is transmitted through a downlink physical-layer control channel In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the first signaling is transmitted through a radio interface between UEs.

In one embodiment, the first signaling is transmitted through a radio interface of sidelink.

In one embodiment, the first signaling is transmitted through a radio interface between a UE and a base station.

In one embodiment, the first signaling is transmitted through a Uu interface.

In one embodiment, the first signaling is transmitted through a PC5 interface.

In one embodiment, the first signal carries a Transport Block (TB).

In one embodiment, the first signal carries a positive integer number of TB(s).

In one embodiment, the first signal is transmitted on a sidelink data channel

In one embodiment, the sidelink data channel is a Sidelink Shared CHannel (SL-SCH).

In one embodiment, the sidelink data channel is a Physical Sidelink Shared Channel (PSSCH).

In one embodiment, the first signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the first signal is transmitted through a radio interface between UEs.

In one embodiment, the first signal is transmitted through a radio interface of sidelink.

In one embodiment, the first signal is transmitted through a radio interface between a UE and a base station.

In one embodiment, the first signal is transmitted through a Uu interface.

In one embodiment, the first signal is transmitted through a PC5 interface.

In one embodiment, any of the M time windows comprises a consecutive duration.

In one embodiment, lengths of any two of the M time windows are the same.

In one embodiment, a number of multicarrier symbol(s) respectively comprised in any two of the M time windows is the same.

In one embodiment, any of the M time windows comprises a slot.

In one embodiment, any of the M time windows comprises a subframe.

In one embodiment, any of the M time windows comprises a mini-slot.

In one embodiment, any of the M time windows comprises a positive integer number of consecutive multicarrier symbol(s).

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multicarrier (FBMC) symbol.

In one embodiment, the multicarrier symbol comprises a Cyclic Prefix (CP).

In one embodiment, the first bit sub-block is a Hybrid Automatic Repeat reQuest-Acknowledge (HARQ-ACK) for the first signal.

In one embodiment, the first bit sub-block comprises a HARQ bit for the first signal.

In one embodiment, the first bit sub-block comprises a bit.

In one embodiment, the first bit sub block comprises a plurality of bits.

In one embodiment, the first bit block comprises a positive integer number of bit sub-block(s), the first bit sub-block being a bit sub-block in the first bit block, any bit sub-block in the first bit block comprises a positive integer number of bit(s).

In one subembodiment of the above embodiment, the first bit block comprises a plurality of bit sub-blocks, and a number of bit(s) respectively comprised in any two bit sub-blocks in the first bit block is the same.

In one subembodiment of the above embodiment, any bit sub-block in the first bit block corresponds to one of the M time windows.

In one subembodiment of the above embodiment, the first bit block comprises K bit sub-block(s), and size(s) of the K bit sub-block(s) is(are) the same.

In one subembodiment of the above embodiment, the first bit block comprises K bit sub-block(s), and the K bit sub-block(s) corresponds(respectively correspond) to K time window(s) in the M time windows, K being a positive integer not greater than the M.

In one subembodiment of the above embodiment, the first bit block comprises K bit sub-block(s), and the K bit sub-block(s) corresponds(respectively correspond) to K earliest time window(s) in the M time windows, K being a positive integer not greater than the M.

In one embodiment, the meaning of the above phrase of "any of the M time windows being associated with the target time window" includes: PSFCH resources reserved for a PSSCH transmitted in any of the M time windows belong to the target time window in time domain.

In one embodiment, the meaning of the above phrase of "any of the M time windows being associated with the target time window" includes: HARQ-ACK resources reserved for a PDSCH transmitted in any of the M time windows belong to the target time window in time domain.

In one embodiment, the meaning of the above phrase of "any of the M time windows being associated with the target time window" includes: a HARQ-ACK of a TB transmitted in any of the M time windows is transmitted in the target time window.

In one embodiment, the meaning of the above phrase of "any of the M time windows being associated with the target time window" includes: a HARQ-ACK of a TB transmitted in any of the M time windows cannot be transmitted in time-domain resources other than the target time window.

In one embodiment, the meaning of the above phrase of "any of the M time windows being associated with the target time window" includes: a HARQ-ACK of a PSSCH transmitted in any of the M time windows is transmitted in the target time window.

In one embodiment, the meaning of the above phrase of "any of the M time windows being associated with the target time window" includes: a HARQ-ACK of a PSSCH transmitted in any of the M time windows cannot be transmitted in time-domain resources other than the target time window.

In one embodiment, the meaning of the above phrase of "any of the M time windows being associated with the target time window" includes: for any given time window in the M time windows, the target time window is an earliest time window in a candidate time window set later than the given time window and with a time interval between the given time window not less than a first interval; the candidate time window comprises a positive integer number of time window(s), and the target time window is a time window in the candidate time window set.

In one subembodiment of the above embodiment, a time interval between two time windows is equal to a time interval between start times of the two time windows.

In one subembodiment of the above embodiment, a time interval between two time windows is equal to a time interval between end times of the two time windows.

In one subembodiment of the above embodiment, a time interval between two time windows is equal to a difference value between indexes of the two time windows.

In one subembodiment of the above embodiment, the first time interval is measured by ms.

In one subembodiment of the above embodiment, the first time interval is measured by slot.

In one subembodiment of the above embodiment, the first time interval is measured by subframe.

In one subembodiment of the above embodiment, the first time interval is measured by mini-slot.

In one subembodiment of the above embodiment, the first time interval is measured by multicarrier symbol.

In one subembodiment of the above embodiment, the first time interval is a non-negative integer.

In one subembodiment of the above embodiment, the first time interval is a positive integer.

In one subembodiment of the above embodiment, the first time interval is a non-negative real number.

In one subembodiment of the above embodiment, the first time interval is a positive real number.

In one subembodiment of the above embodiment, any two time windows in the candidate time window set are orthogonal.

In one subembodiment of the above embodiment, lengths of any two time windows in the candidate time window set are the same.

In one subembodiment of the above embodiment, any time window in the candidate time window set comprises a consecutive duration.

In one subembodiment of the above embodiment, any time window in the candidate time window set comprises a slot.

In one subembodiment of the above embodiment, any time window in the candidate time window set comprises a subframe.

In one subembodiment of the above embodiment, any time window in the candidate time window set comprises a mini-slot.

In one subembodiment of the above embodiment, any time window in the candidate time window set comprises a positive integer number of consecutive multicarrier symbol(s).

In one subembodiment of the above embodiment, a length of any time window in the candidate time window set is the same as a length of one of the M time windows.

In one subembodiment of the above embodiment, a number of multicarrier symbols respectively comprised in a time window in the candidate time window set and one of the M time windows is the same.

In one subembodiment of the above embodiment, any time window in the candidate time window set comprises time-domain resources used to transmit Uplink Control Information (UCI).

In one subembodiment of the above embodiment, any time window in the candidate time window set can be used to transmit time-domain resources of a HARQ-ACK.

In one subembodiment of the above embodiment, any time window in the candidate time window set can be used to transmit time-domain resources of a PSFCH.

In one embodiment, a size of the first bit block is equal to a number of bit(s) comprised in the first bit block.

In one embodiment, a size of the first bit sub-block is equal to a number of bit(s) comprised in the first bit sub-block.

In one embodiment, a size of a given bit sub-block is equal to a number of bit(s) comprised in the given bit sub-block, and the given bit sub-block is any bit sub-block in the first bit block.

In one embodiment, the position of the first time window among the M time windows is a positive integer.

In one embodiment, the position of the first time window among the M time windows is sorted according to an arrangement of the first time window among the M time windows in a first arrangement order.

In one embodiment, according to a first arrangement order, the first time window is a K-th time window among the M time windows, K being a positive integer not greater than the M; the position of the first time window among the K time windows is K.

In one embodiment, the first arrangement order is a chronologically ascending order.

In one embodiment, the first arrangement order is a chronologically descending order.

In one embodiment, the first arrangement order is an order that corresponding indexes are sorted in an ascending order.

In one embodiment, the first arrangement order is an order that corresponding indexes are sorted in a descending order.

In one embodiment, the first radio resource block comprises at least one of time-domain resources, frequency-domain resources or code-domain resources In one embodiment, the first radio resource block comprises time-domain resources and frequency-domain resources.

In one embodiment, the first radio resource block comprises time-domain resources, frequency-domain resources and code-domain resources.

In one embodiment, the first radio resource block comprises a positive integer number of multicarrier symbol(s) in time domain.

In one embodiment, the first radio resource block comprises one multicarrier symbol in time domain.

In one embodiment, the first radio resource block comprises a positive integer number of subcarrier symbol(s) in frequency domain.

In one embodiment, the first radio resource block comprises a positive integer number of Resource Block(s) (RB(s)) in frequency domain.

In one embodiment, the first radio resource block comprises one RB in frequency domain.

In one embodiment, the first radio resource block comprises a positive integer number of Resource Element(s) (RE(s)).

In one embodiment, the first signaling is used to determine the first radio resource block.

In one embodiment, time-frequency resources occupied by the first signaling are used to determine the first radio resource block.

In one embodiment, time-frequency resources occupied by the first signaling are associated with the first radio resource block.

In one embodiment, the first radio resource block is inferred according to time-frequency resources occupied by the first signaling.

In one embodiment, the first signaling is used to indicate the first radio resource block.

In one embodiment, the first signaling explicitly indicates the first radio resource block.

In one embodiment, the first signaling implicitly indicates the first radio resource block.

In one embodiment, the first radio resource is associated with the first signal.

In one embodiment, time-frequency resources occupied by the first signal are used to determine the first radio resource block.

In one embodiment, the first radio resource block is associated with time-frequency resources occupied by the first signal.

In one embodiment, the first radio resource block is inferred according to time-frequency resources occupied by the first signal.

In one embodiment, the first time window and a starting RB occupied by the first signal are used together to determine the first radio resource block.

In one embodiment, the first radio resource block can be inferred according to the first time window and a starting RB occupied by the first signal.

In one embodiment, an index of the first time window and an index of a starting RB occupied by the first signal are used together to determine the first radio resource block.

In one embodiment, the first radio resource block can be inferred according to an index of the first time window and an index of a starting RB occupied by the first signal.

In one embodiment, a starting RB occupied by a given signal is an RB with a lowest index among RBs occupied by the given signal.

In one embodiment, a starting RB occupied by a given signal is an RB with a highest index among RBs occupied by the given signal.

In one embodiment, a number of RE(s) occupied by the first radio resource block is related to a position of the first time window in the M time windows.

In one embodiment, the later the order of the first time window among the M time window according to a first arrangement order, the more REs occupied by the first radio resource block.

In one embodiment, the higher the order of the first time window among the M time window according to a first arrangement order, the more REs occupied by the first radio resource block.

In one embodiment, a number of RB(s) occupied by the first radio resource block in frequency domain is related to a position of the first time window in the M time windows.

In one embodiment, the later the order of the first time window among the M time window according to a first arrangement order, the more RBs occupied by the first radio resource block in frequency domain.

In one embodiment, the higher the order of the first time window among the M time window according to a first arrangement order, the more RBs occupied by the first radio resource block in frequency domain.

In one embodiment, a number of multicarrier symbol(s) occupied by the first radio resource block in time domain is related to a position of the first time window in the M time windows.

In one embodiment, the later the order of the first time window among the M time window according to a first arrangement order, the more multicarrier symbols occupied by the first radio resource block in time domain.

In one embodiment, the higher the order of the first time window among the M time window according to a first arrangement order, the more multicarrier symbols occupied by the first radio resource block in time domain.

Embodiment 2

Figure 2:
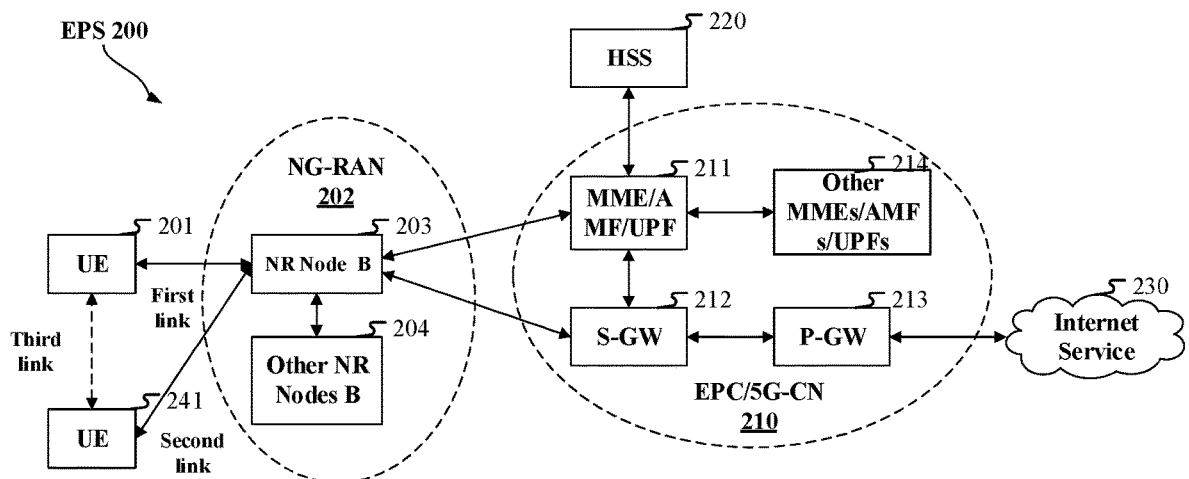
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

In one embodiment, the gNB 203 corresponds to the third node in the present disclosure.

Embodiment 3

Figure 3:
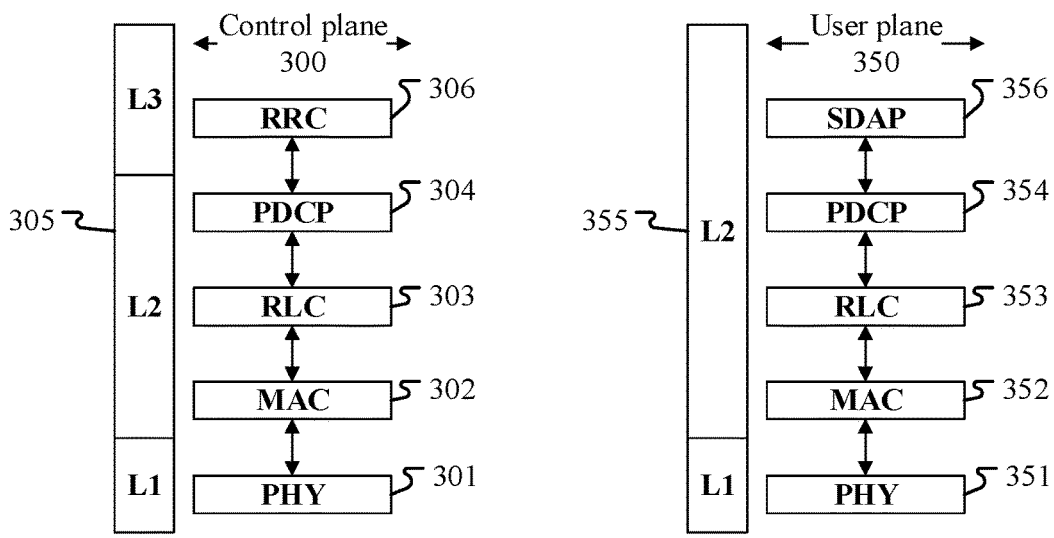
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the MAC sublayer 352.

In one embodiment, the first information in the present disclosure is generated by the PHY 301.

In one embodiment, the first information in the present disclosure is generated by the PHY 351.

In one embodiment, the first signaling in the present disclosure is generated by the PHY 301.

In one embodiment, the first signaling in the present disclosure is generated by the PHY 351.

In one embodiment, the M1-1 signal(s) in the present disclosure is(are) generated by the PHY 301.

In one embodiment, the M1-1 signal(s) in the present disclosure is(are) generated by the PHY 351.

In one embodiment, the first signal in the present disclosure is generated by the PHY 301.

In one embodiment, the first signal in the present disclosure is generated by the PHY 351.

In one embodiment, the first bit block in the present disclosure is generated by the PHY 301.

In one embodiment, the first bit block in the present disclosure is generated by the PHY 351.

Embodiment 4

Figure 4:
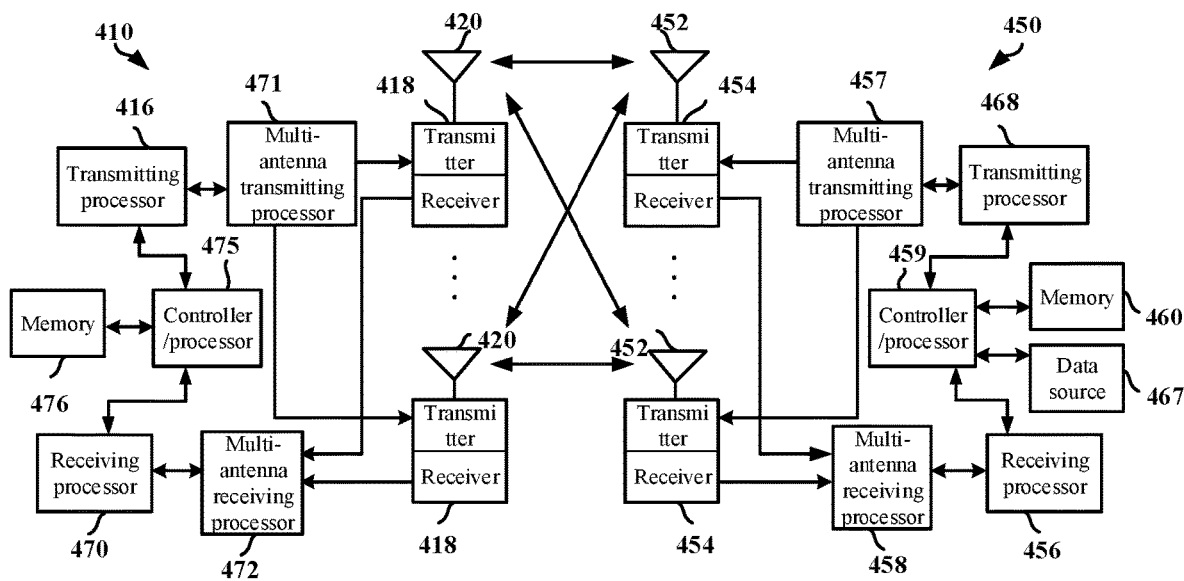
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the third node in the present disclosure comprises the first communication device 410.

In one subembodiment of the above embodiment, the first node is a UE, and the second node is a UE, and the third node is a base station.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling; receives a first signal in a first time window; and transmits a first bit block in a first radio resource block; herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first signaling; receiving a first signal in a first time window; and transmitting a first bit block in a first radio resource block; herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; transmits a first signal in a first time window; and receives a first bit block in a first radio resource block; herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first signaling; transmitting a first signal in a first time window; and receiving a first bit block in a first radio resource block; herein, the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, at least one of the antenna 420, the receiver 418, the multi-antenna receiving processor 472, the receiving processor 470, the controller/processor 475, or the memory 476 is used to operate the first information in the present disclosure, and the operating action is receiving.

In one embodiment, at least one of the antenna 420, the transmitter 418, the multi-antenna transmitting processor 471, the transmitting processor 416, the controller/processor 475, or the memory 476 is used to operate the first information in the present disclosure, and the operating action is transmitting.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the receiver 454, the multi-antenna receiving processor 458, the receiving processor 456, the controller/processor 459, the memory 460, or the data source 467 is used to receive the M1-1 signal(s) in the present disclosure respectively in the M1-1 time window(s) in the present disclosure.

In one embodiment, at least one of the antenna 420, the transmitter 418, the multi-antenna transmitting processor 471, the transmitting processor 416, the controller/processor 475, or the memory 476 is used to transmit the M1-1 signal(s) in the present disclosure respectively in the M1-1 time window(s) in the present disclosure.

In one embodiment, at least one of the antenna 452, the receiver 454, the multi-antenna receiving processor 458, the receiving processor 456, the controller/processor 459, the memory 460, or the data source 467 is used to receive the first signal in the present disclosure in the first time window in the present disclosure.

In one embodiment, at least one of the antenna 420, the transmitter 418, the multi-antenna transmitting processor 471, the transmitting processor 416, the controller/processor 475, or the memory 476 is used to transmit the first signal in the present disclosure in the first time window in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first bit block in the present disclosure in the first radio resource block in the present disclosure.

In one embodiment, at least one of the antenna 420, the receiver 418, the multi-antenna receiving processor 472, the receiving processor 470, the controller/processor 475, or the memory 476 is used to receive the first bit block in the present disclosure in the first radio resource block in the present disclosure.

Embodiment 5

Figure 5:
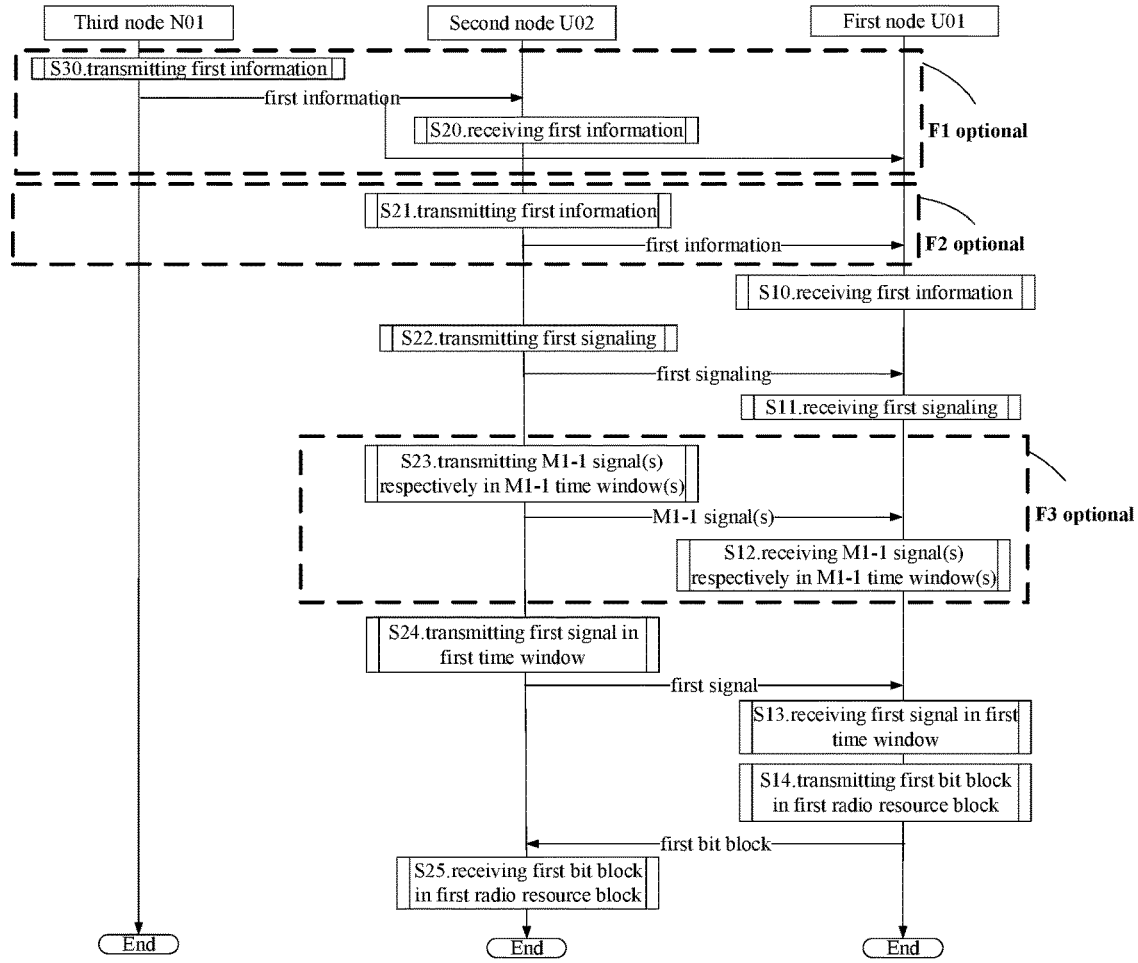
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5 a first node U01 and a second node U02 are in communications through an air interface. In FIG. 5, only one of the dashed rectangles F1 and F2 exists, and the dashed rectangle F3 is optional.

The first node U01 receives first information in step S010; receives a first signaling in step S11; receives M1-1 signal(s) respectively in M1-1 time window(s) in step S12; receives a first signal in a first time window in step S13; transmits a first bit block in a first radio resource block in step S14.

The second node U02 receives first information in step S20; transmits first information in step S21; transmits a first signaling in step S22; and transmits M1-1 signal(s) respectively in M1-1 time window(s) in step S23; transmits a first signal in a first time window in step S24; receives a first bit block in a first radio resource block in step S25.

The third node N01 transmits first information in step S30.

In Embodiment 5, the first signaling is used to indicate configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used by the first node U01 to determine a size of the first bit block; the first bit block comprises a positive integer number of bit(s), and the first bit sub-block comprises a positive integer number of bit(s); M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks. The first information is used by the first node U01 to determine M.

In one embodiment, the operating action in the present disclosure is receiving.

In one embodiment, the operating action in the present disclosure is transmitting.

In one embodiment, the operating action in the present disclosure is receiving, the dashed rectangle F1 exists, and the dashed rectangle F2 does not exist.

In one embodiment, the operating action in the present disclosure is transmitting, the dashed rectangle F2 exists, and the dashed rectangle F1 does not exist.

In one embodiment, configuration information for a given signal comprises occupied frequency-domain resources.

In one subembodiment of the above embodiment, the given signal is the first signal.

In one subembodiment of the above embodiment, the given signal is any of the M1 signals.

In one embodiment, configuration information for a given signal comprises occupied frequency-domain resources, and a destination ID.

In one subembodiment of the above embodiment, the given signal is the first signal.

In one subembodiment of the above embodiment, the given signal is any of the M1 signals.

In one embodiment, configuration information for a given signal comprises occupied frequency-domain resources and a Hybrid Automatic Repeat reQuest (HARQ) process number.

In one subembodiment of the above embodiment, the given signal is the first signal.

In one subembodiment of the above embodiment, the given signal is any of the M1 signals.

In one embodiment, configuration information for a given signal comprises time-domain resources, occupied frequency-domain resources, a HARQ process number and a Downlink Assignment Index (DAT).

In one subembodiment of the above embodiment, the given signal is the first signal.

In one subembodiment of the above embodiment, the given signal is any of the M1 signals.

In one embodiment, configuration information for a given signal comprises at least one of occupied time-domain resources, occupied frequency-domain resources, a Modulation and Coding Scheme (MCS), configuration information for DeModulation Reference Signals (DMRS), a Hybrid Automatic Repeat request (HARQ) process number, a Redundancy Version (RV), a New Data Indicator (NDI), a Downlink Assignment Index (DAI), a transmitting antenna port, a corresponding multi-antenna associated transmission or a corresponding multi-antenna associated reception.

In one subembodiment of the above embodiment, the given signal is the first signal.

In one subembodiment of the above embodiment, the given signal is any of the M1 signals.

In one embodiment, configuration information for a given signal comprises a priority, occupied frequency-domain resources, and a destination ID.

In one subembodiment of the above embodiment, the given signal is the first signal.

In one subembodiment of the above embodiment, the given signal is any of the M1 signals.

In one embodiment, configuration information for a given signal comprises a priority, occupied frequency-domain resources, a destination ID and a source ID.

In one subembodiment of the above embodiment, the given signal is the first signal.

In one subembodiment of the above embodiment, the given signal is any of the M1 signals.

In one embodiment, configuration information for a given signal comprises at least one of priority, occupied frequency-domain resources, occupied time-domain resources, an MCS, a resource reservation, a retransmission index, configuration information for DeModulation Reference Signals (DMRS), transmitting antenna ports, a transmit power indication, a Destination ID, a Source ID, a Hybrid Automatic Repeat reQuest (HARQ) process number, a New Data Indicator (NDI), or a Redundancy Version (RV).

In one subembodiment of the above embodiment, the given signal is the first signal.

In one subembodiment of the above embodiment, the given signal is any of the M1 signals.

In one embodiment, the configuration information for the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, a length of a given time window is a duration of the given time window.

In one subembodiment of the above embodiment, the given time window is any of the M time windows.

In one subembodiment of the above embodiment, the given time window is the target time window.

In one subembodiment of the above embodiment, the given time window is any time window in the candidate time window set.

In one subembodiment of the above embodiment, the given time window is any time window in the first time window pool.

In one embodiment, a length of a given time window is a number of multicarrier symbol(s) comprised in the given time window.

In one subembodiment of the above embodiment, the given time window is any of the M time windows.

In one subembodiment of the above embodiment, the given time window is the target time window.

In one subembodiment of the above embodiment, the given time window is any time window in the candidate time window set.

In one subembodiment of the above embodiment, the given time window is any time window in the first time window pool.

In one embodiment, a length of a given time window is a number of slot(s) comprised in the given time window.

In one subembodiment of the above embodiment, the given time window is any of the M time windows.

In one subembodiment of the above embodiment, the given time window is the target time window.

In one subembodiment of the above embodiment, the given time window is any time window in the candidate time window set.

In one subembodiment of the above embodiment, the given time window is any time window in the first time window pool.

In one embodiment, a length of a given time window is a number of subframe(s) comprised in the given time window.

In one subembodiment of the above embodiment, the given time window is any of the M time windows.

In one subembodiment of the above embodiment, the given time window is the target time window.

In one subembodiment of the above embodiment, the given time window is any time window in the candidate time window set.

In one subembodiment of the above embodiment, the given time window is any time window in the first time window pool.

In one embodiment, a length of a given time window is a number of mini-slot(s) comprised in the given time window.

In one subembodiment of the above embodiment, the given time window is any of the M time windows.

In one subembodiment of the above embodiment, the given time window is the target time window.

In one subembodiment of the above embodiment, the given time window is any time window in the candidate time window set.

In one subembodiment of the above embodiment, the given time window is any time window in the first time window pool.

In one embodiment, the first information is carried by a higher-layer signaling.

In one embodiment, the first information is semi-statically configured.

In one embodiment, the first information is carried by a physical-layer signaling.

In one embodiment, the first information is carried by the first signaling.

In one embodiment, the first information is carried by a Radio Resource Control (RRC) signaling.

In one embodiment, the first information is carried by a MAC CE signaling.

In one embodiment, the first information comprises one or more Information Elements (IEs) in an RRC signaling.

In one embodiment, the first information comprises all or part of an IE in an RRC signaling.

In one embodiment, the first information comprises partial fields of an IE in an RRC signaling In one embodiment, the first information comprises a plurality of IEs in an RRC signaling.

In one embodiment, the first information comprises one IE in an RRC signaling.

In one embodiment, the first information is broadcast.

In one embodiment, the first information is groupcast.

In one embodiment, the first information is unicast.

In one embodiment, the first information is transmitted on a Broadcast CHannel (BCH).

In one embodiment, the first information belongs to a Master Information Block (MIB).

In one embodiment, the first information belongs to a System Information Block (SIB).

In one embodiment, the first information is carried by a DCI signaling

In one embodiment, the first information is carried by an SCI signaling.

In one embodiment, the first information is transmitted through an interface between a base station and a UE.

In one embodiment, the first information is transmitted through a Uu interface.

In one embodiment, the first information is transmitted through a PC5 interface.

In one embodiment, the first information is transmitted through a radio interface of sidelink.

In one embodiment, the first information is transmitted through an interface between UEs.

In one embodiment, the first information is used to indicate M.

In one embodiment, the first information explicitly indicates M.

In one embodiment, the first information implicitly indicates M.

In one embodiment, the M time windows and the target time window belong to the first time window pool, the first time window pool comprises a positive integer number of time window(s), and only the M time windows in the first time window pool are associated with the target time window; a candidate time window set comprises a positive integer number of time window(s), the candidate time window set belongs to the first time window pool, and the target time window is a time window in the candidate time window set.

In one subembodiment of the above embodiment, the first information is also used to indicate the first time window pool.

In one subembodiment of the above embodiment, M is used to determine the candidate time window set out of the first time window pool.

In one subembodiment of the above embodiment, the first information is used to determine the candidate time window set.

In one subembodiment of the above embodiment, the first information is used to determine the candidate time window set out of the first time window pool.

In one subembodiment of the above embodiment, the candidate time window set occurs periodically in the first time window pool, and a period of the candidate time window set in the first time window pool is equal to M.

In one subembodiment of the above embodiment, M, the first time window pool and a first interval are used to determine that the M time windows are associated with the target time window.

In one subembodiment of the above embodiment, the target time window, M and the first interval are used to determine the M time windows.

In one subembodiment of the above embodiment, the candidate time window set and the first interval are used to determine that the M time windows are associated with the target time window.

In one subembodiment of the above embodiment, for any given time window in the M time windows, the target time window is an earliest time window in a candidate time window set that is later than the given time window and with a time interval between the given time window not less than a first interval.

In one subembodiment of the above embodiment, any two time windows in the candidate time window set are orthogonal.

In one subembodiment of the above embodiment, lengths of any two time windows in the candidate time window set are the same.

In one subembodiment of the above embodiment, any time window in the first time window pool comprises a consecutive duration.

In one subembodiment of the above embodiment, any time window in the first time window pool comprises a slot.

In one subembodiment of the above embodiment, any time window in the first time window pool comprises a subframe.

In one subembodiment of the above embodiment, any time window in the first time window pool comprises a mini-slot.

In one subembodiment of the above embodiment, any time window in the first time window pool comprises a positive integer number of consecutive multicarrier symbol(s).

In one embodiment, the target time window comprises a continuous duration.

In one embodiment, the target time window comprises a slot.

In one embodiment, the target time window comprises a subframe.

In one embodiment, the target time window comprises a mini-slot.

In one embodiment, the target time window comprises a positive integer number of consecutive multicarrier symbol(s).

In one embodiment, a length of the target time window is the same as a length of one of the M time windows.

In one embodiment, a number of multicarrier symbol(s) respectively comprised in the target time window and one of the M time windows is the same.

In one embodiment, a start time of the target time window is not earlier than a start time of a latest one of the M time windows.

In one embodiment, a start time of the target time window is not earlier than an end time of a latest one of the M time windows.

In one embodiment, a start time of the target time window is later than an end time of a latest one of the M time windows.

In one embodiment, the target time window is a latest of the M time windows.

In one embodiment, a method in the second node comprises:

monitoring whether a HARQ-ACK is transmitted respectively in M1 radio resource blocks;

herein, M1 radio resource blocks are respectively associated with the M1 signals, each of the M1 radio resource blocks belongs to a target time window in time domain, and the first radio resource block is one of the M1 radio resource blocks associated with the first signal; a HARQ-ACK for the M1 signals is detected in only the first radio resource block in the M1 radio resource blocks.

In one embodiment, the monitoring refers to a blind detection, that is, a signal is received in a given radio resource block and a decoding operation is executed, and when the decoding is determined to be correct according to a CRC bit, the second node determines that a HARQ-ACK is correctly received; otherwise the second node determines that a HARQ-ACK is wrongly received; the given radio resource block is any of the M1 radio resource blocks.

In one embodiment, the monitoring refers to a coherent detection, that is, a coherent reception is performed in the given radio resource block with an RS sequence of a DMRS, and energy of a signal obtained after the coherent reception is measured. When energy of a signal obtained after the coherent reception is greater than a first given threshold, the second node determines that a HARQ-ACK is correctly received; otherwise the second node determines that a HARQ-ACK is wrongly received; the given radio resource block is any of the M1 radio resource blocks.

In one embodiment, the monitoring refers to an energy detection, that is, energy of a radio signal is sensed in a given radio resource block and is averaged in time to obtain received energy. When the reception energy is greater than a given threshold, the second node determines that a HARQ-ACK is correctly received; otherwise the second node determines that a HARQ-ACK is wrongly received; the given radio resource block is any of the M1 radio resource blocks.

Embodiment 6

Figure 6:
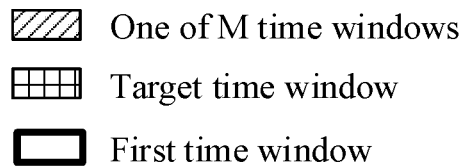
FIG. 6 illustrates a schematic diagram of a first signal, M time windows and a target time window according to one embodiment of the present disclosure.
Figure 6:
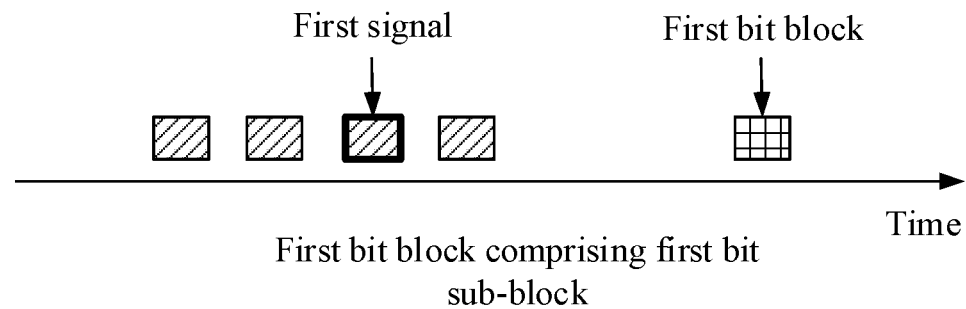

Embodiment 6 illustrates a schematic diagram of a first signal, M time windows and a target time window according to one embodiment of the present disclosure, as shown in FIG. 6.

In embodiment 6, the first time window in the present disclosure is one of the M time windows, and any two of the M time windows are orthogonal, M being a positive integer greater than 1; the first radio resource block in the present disclosure belongs to the target time window in time domain, any of the M time windows is associated with the target time window; the first bit block in the present disclosure comprises a first bit sub-block, the first bit sub-block being used to indicate whether the first signal is correctly received.

Embodiment 7

Figure 7:
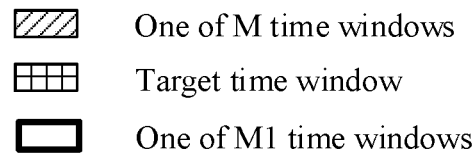
FIG. 7 illustrates a schematic diagram of M1 signals, M time windows and a target time window according to one embodiment of the present disclosure.
Figure 7:
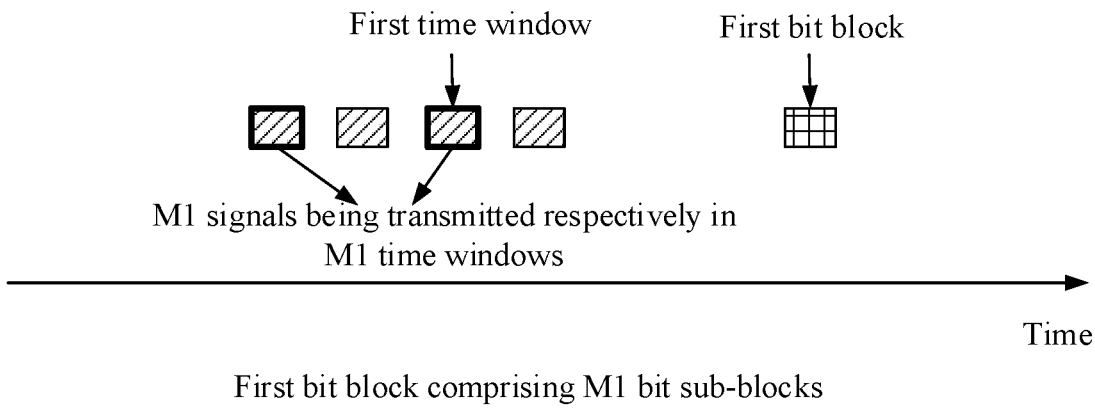

Embodiment 7 illustrates a schematic diagram of M1 signals, M time windows and a target time window according to one embodiment of the present disclosure, as shown in FIG. 7.

In embodiment 7, the M1 signals consist of the first signal in the present disclosure and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; the first radio resource block belongs to the target time window in time domain, any of the M time windows is associated with the target time window; M1 bit sub-blocks are respectively used for indicating whether the M1 signals are correctly received, the first bit sub-block in the present disclosure being one of the M1 bit sub-blocks, the first bit block comprising the M1 bit sub-blocks.

In one embodiment, the M1 bit sub-blocks respectively comprise HARQ-ACKs of the M1 signals.

In one embodiment, the M1 bit sub-blocks respectively comprise HARQ bits of the M1 signals.

In one embodiment, any of the M1 bit sub-blocks comprises a bit.

In one embodiment, any of the M1 bit sub-blocks comprises at least one bit.

In one embodiment, a start time of the first time window is later than an end time of the M1-1 time window(s).

In one embodiment, any of the M1 signals carries a TB.

In one embodiment, any of the M1 signals carries a positive integer number of TB(s).

In one embodiment, any of the M1 signals is transmitted on a sidelink data channel In one embodiment, any of the M1 signals is transmitted on a downlink physical layer data channel (i.e., a downlink channel capable of carrying physical layer data).

In one embodiment, any of the M1 signals is transmitted through a radio interface between UEs.

In one embodiment, any of the M1 signals is transmitted through a sidelink radio interface.

In one embodiment, any of the M1 signals is transmitted through a radio interface between a UE and a base station.

In one embodiment, any of the M1 signals is transmitted through a Uu interface.

In one embodiment, any of the M1 signals is transmitted through a PC5 interface.

In one embodiment, K is greater than 1, the first bit block comprises K bit sub-blocks, and any bit sub-block of the K bit blocks comprises a positive integer number of bit(s); any of the M1 bit sub-blocks is one of the K bit sub-blocks, K being a positive integer not less than M1.

In one subembodiment of the above embodiment, M1 is equal to K.

In one subembodiment of the above embodiment, M1 is less than K.

In one embodiment, K is greater than 1, the first bit block comprises K bit sub-blocks, and the K bit sub-blocks respectively correspond to K time windows in the M time windows; any of the M1 time windows is one of the K time windows.

In one subembodiment of the above embodiment, M1 is equal to K.

In one subembodiment of the above embodiment, M1 is less than K.

In one embodiment, when K is greater than M1, the first bit block comprises K bit sub-blocks, a given sub-block is any of the K bit sub-blocks other than the M1 bit sub-blocks, and the given bit sub-block corresponds to a given time window in the M time windows.

In one subembodiment of the above embodiment, the first node does not detect a TB transmission in the given time window.

In one subembodiment of the above embodiment, the given bit sub-block indicates a NACK.

In one subembodiment of the above embodiment, the given bit sub-block indicates an ACK.

In one subembodiment of the above embodiment, the first node does not detect a TB transmission from a transmitter of the first signaling in the given time window.

In one subembodiment of the above embodiment, the given bit sub-block indicates a NACK.

In one subembodiment of the above embodiment, the given bit sub-block indicates an ACK.

In one subembodiment of the above embodiment, the first node does not detect an SCI signaling in the given time window.

In one subembodiment of the above embodiment, the given bit sub-block indicates a NACK.

In one subembodiment of the above embodiment, the given bit sub-block indicates an ACK.

In one subembodiment of the above embodiment, the first node does not detect an SCI signaling from a transmitter of the first signaling in the given time window.

In one subembodiment of the above embodiment, the given bit sub-block indicates a NACK.

In one subembodiment of the above embodiment, the given bit sub-block indicates an ACK.

In one subembodiment of the above embodiment, the first node does not detect a PSSCH transmission in the given time window.

In one subembodiment of the above embodiment, the given bit sub-block indicates a NACK.

In one subembodiment of the above embodiment, the first node does not detect a PSSCH transmission in the given time window.

In one subembodiment of the above embodiment, the given bit sub-block indicates an ACK.

In one subembodiment of the above embodiment, the first node does not detect a PSSCH transmission from a transmitter of the first signaling in the given time window.

In one subembodiment of the above embodiment, the given bit sub-block indicates a NACK.

In one subembodiment of the above embodiment, the first node does not detect a PSSCH transmission from a transmitter of the first signaling in the given time window.

In one subembodiment of the above embodiment, the given bit sub-block indicates an ACK.

In one embodiment, M1 radio resource blocks are respectively associated with the M1 signals, each of the M1 radio resource blocks belongs to a target time window in time domain, and the first radio resource block is one of the M1 radio resource blocks associated with the first signal.

In one embodiment, a given radio resource block is any of the M1 radio resource blocks, the given radio resource block is associated with a given signal in the M1 signals, and the given signal is one of the M1 signals; the first signaling comprises M1 sub-signalings, the M1 sub-signalings are respectively used to indicate configuration information for the M1 signals, a given sub-signaling is one of the M1 sub-signalings being used to indicate configuration information for the given signal, and the given sub-signaling is used to determine the given radio resource block.

In one subembodiment of the above embodiment, time-frequency resources occupied by the given sub-signaling are used to determine the given radio resource block.

In one subembodiment of the above embodiment, time-frequency resources occupied by the given sub-signaling are associated with the given radio resource block.

In one subembodiment of the above embodiment, the given radio resource block can be inferred from time-frequency resources occupied by the given sub-signaling.

In one subembodiment of the above embodiment, the given sub-signaling is used to indicate the given radio resource block.

In one subembodiment of the above embodiment, the given sub-signaling explicitly indicates the given radio resource block.

In one subembodiment of the above embodiment, the given sub-signaling implicitly indicates the given radio resource block.

In one embodiment, the first signaling is used to indicate a set of configuration information for the M1 signals, and the first signaling is used to determine the M1 radio resource blocks.

In one subembodiment of the above embodiment, time-frequency resources occupied by the first signaling are used to determine the M1 radio resource blocks.

In one subembodiment of the above embodiment, time-frequency resources occupied by the first signaling are associated with the M1 radio resource blocks.

In one subembodiment of the above embodiment, the M1 radio resource blocks can be inferred from time-frequency resources occupied by the first signaling.

In one subembodiment of the above embodiment, the first signaling is used to indicate the M1 radio resource blocks.

In one subembodiment of the above embodiment, the first signaling explicitly indicates the M1 radio resource blocks.

In one subembodiment of the above embodiment, the first signaling implicitly indicates the M1 radio resource blocks.

In one embodiment, a given radio resource block is any of the M1 radio resource blocks, the given radio resource block is associated with a given signal in the M1 signals, and time-domain resources occupied by the given signal belong to a given time window in the M1 time windows; the given signal is one of the M1 signals, and the given time window is one of the M1 time windows.

In one subembodiment of the above embodiment, time-frequency resources occupied by the given signal are used to determine the given radio resource block.

In one subembodiment of the above embodiment, the given radio resource block is associated with time-frequency resources occupied by the given signal.

In one subembodiment of the above embodiment, the given radio resource block can be inferred from time-frequency resources occupied by the given signal.

In one subembodiment of the above embodiment, the given time window and a starting RB occupied by the given signal are used together to determine the given radio resource block.

In one subembodiment of the above embodiment, the given radio resource block can be inferred from the given time window and a starting RB occupied by the given signal.

In one subembodiment of the above embodiment, an index of the given time window and an index of a starting RB occupied by the given signal are used together to determine the given radio resource block.

In one subembodiment of the above embodiment, the given radio resource block can be inferred from an index of the given time window and an index of a starting RB occupied by the given signal.

In one subembodiment of the above embodiment, a starting RB occupied by a given signal is an RB with a lowest index in RBs occupied by the given signal.

In one subembodiment of the above embodiment, a starting RB occupied by a given signal is an RB with a highest index in RBs occupied by the given signal.

Embodiment 8

Figure 8:
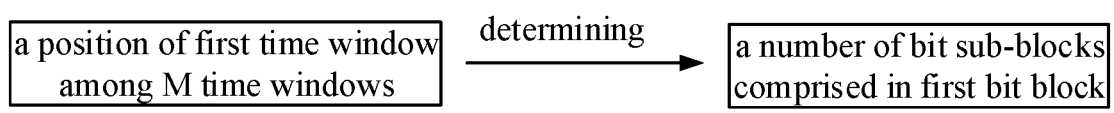
FIG. 8 illustrates a schematic diagram of a number of bit sub-block(s) comprised in a first bit block according to one embodiment of the present disclosure.

Embodiment 8 illustrates a schematic diagram of a number of bit sub-block(s) comprised in a first bit block according to one embodiment of the present disclosure, as shown in FIG. 8.

In embodiment 8, the first bit block comprises a positive integer number of bit sub-block(s), the first bit sub-block in the present disclosure being a bit sub-block in the first bit block, any bit sub-block in the first bit block comprising a positive integer number of bit(s); any bit sub-block in the first bit block corresponds to one of the M time windows in the present disclosure; a position of the first time window in the M time windows is used to determine a number of bit sub-block(s) comprised in the first bit block.

In one embodiment, a given bit sub-block is any bit sub-block in the first bit block, and a given time window is one of the M time widows corresponding to the given bit sub-block.

In one subembodiment of the above embodiment, the given bit sub-block is used to indicate whether a TB is successfully received in the given time window.

In one subembodiment of the above embodiment, the given bit sub-block is used to indicate whether a PSSCH is successfully received in the given time window.

In one subembodiment of the above embodiment, the given bit sub-block comprises a HARQ bit corresponding to the given time window.

In one subembodiment of the above embodiment, the given bit sub-block comprises a HARQ bit corresponding to PSSCH resources in the given time window.

In one subembodiment of the above embodiment, the given bit sub-block corresponds to only the given time window in the M time windows.

In one subembodiment of the above embodiment, the given bit sub-block does not correspond to any of the M time windows other than the given time window.

Embodiment 9

Embodiment 9 illustrates a schematic diagram of a number of bit sub-block(s) comprised in a first bit block according to another embodiment of the present disclosure, as shown in FIG. 9.

In embodiment 9, the first time window in the present disclosure is a K-th time window in the M time windows, K being a positive integer not greater than the M; the number of the bit sub-block(s) comprised in the first bit block is equal to the K.

In one embodiment, the number of bit sub-block(s) comprised in the first bit block is a positive integer not greater than M.

In one embodiment, the M time windows are sorted according to a first arrangement order, and the first time window is a K-th time window in the M time windows.

In one embodiment, K is equal to 1, and the first bit block only comprises the first bit sub-block.

In one embodiment, K is greater than 1, the first bit block comprises K bit sub-blocks, and the K bit sub-blocks respectively correspond to K time windows in the M time windows.

In one embodiment, K is greater than 1, the first bit block comprises K bit sub-blocks, and the K bit sub-blocks respectively correspond to first K time windows in the M time windows.

In one embodiment, K is greater than 1, the first bit block comprises K bit sub-blocks, a given sub-block is any of the K bit sub-blocks, and the given bit sub-block corresponds to a given time window in the M time windows.

In one subembodiment of the above embodiment, when the first node does not detect a TB transmission in the given time window, the given bit sub-block indicates a NACK.

In one subembodiment of the above embodiment, when the first node does not detect a TB transmission in the given time window, the given bit sub-block indicates an ACK.

In one subembodiment of the above embodiment, when the first node does not detect a TB transmission from a transmitter of the first signaling in the given time window, the given bit sub-block indicates a NACK.

In one subembodiment of the above embodiment, when the first node does not detect a TB transmission from a transmitter of the first signaling in the given time window, the given bit sub-block indicates an ACK.

In one subembodiment of the above embodiment, when the first node does not detect an SCI signaling in the given time window, the given bit sub-block indicates a NACK.

In one subembodiment of the above embodiment, when the first node does not detect an SCI signaling in the given time window, the given bit sub-block indicates an ACK.

In one subembodiment of the above embodiment, when the first node does not detect an SCI signaling from a transmitter of the first signaling in the given time window, the given bit sub-block indicates a NACK.

In one subembodiment of the above embodiment, when the first node does not detect an SCI signaling from a transmitter of the first signaling in the given time window, the given bit sub-block indicates an ACK.

In one subembodiment of the above embodiment, when the first node does not detect a PSSCH transmission in the given time window, the given bit sub-block indicates a NACK.

In one subembodiment of the above embodiment, when the first node does not detect a PSSCH transmission in the given time window, the given bit sub-block indicates an ACK.

In one subembodiment of the above embodiment, when the first node does not detect a PSSCH transmission from a transmitter of the first signaling in the given time window, the given bit sub-block indicates a NACK.

In one subembodiment of the above embodiment, when the first node does not detect a PSSCH transmission from a transmitter of the first signaling in the given time window, the given bit sub-block indicates an ACK.

Embodiment 10

Embodiment 10 illustrates a schematic diagram of a size of a first bit block according to one embodiment of the present disclosure, as shown in FIG. 10.

In embodiment 10, the size of the first bit block is equal to a product of the size of the first bit sub-block and the number of the bit sub-block(s) comprised in the first bit block.

In one embodiment, a number of bit(s) respectively comprised in any bit sub-block in the first bit block and the first bit sub-block is the same.

Embodiment 11

Embodiment 11 illustrates a schematic diagram of a relation between a first signaling and a first signal according to one embodiment of the present disclosure, as shown in FIG. 11.

In embodiment 11, the first signaling is used to indicate configuration information for the first signal.

In one embodiment, the first signaling explicitly indicates configuration information for the first signal.

In one embodiment, the first signaling implicitly indicates configuration information for the first signal.

Embodiment 12

Embodiment 12 illustrates a schematic diagram of a relation between a first signaling and M1 signals according to one embodiment of the present disclosure, as shown in FIG. 12.

In embodiment 12, the first signaling is used to indicate a set of configuration information for the M1 signals.

In one embodiment, a set of configuration information for the M1 signals comprises configuration information for each of the M1 signals.

In one embodiment, the first signaling explicitly indicate a set of configuration information for the M1 signals.

In one embodiment, the first signaling implicitly indicates a set of configuration information for the M1 signals.

Embodiment 13

Embodiment 13 illustrates a schematic diagram of a relation between a first signaling and M1 signals according to another embodiment of the present disclosure, as shown in FIG. 13.

In embodiment 13, the first signaling comprises M1 sub-signalings, the M1 sub-signalings being respectively used to indicate configuration information for the M1 signals.

In one embodiment, time-frequency resources respectively occupied by any two of the M1 sub-signalings are orthogonal.

In one embodiment, frequency-domain resources occupied by the M1 sub-signalings respectively belong to frequency-domain resources occupied by the M1 signals.

In one embodiment, time-domain resources occupied by the M1 sub-signalings are respectively associated with time-domain resources occupied by the M1 signals.

In one embodiment, time-domain resources occupied by the M1 sub-signalings respectively belong to the M1 time windows.

In one embodiment, the M1 sub-signalings respectively and explicitly indicate configuration information for the M1 signals.

In one embodiment, the M1 sub-signalings respectively and implicitly indicate configuration information for the M1 signals.

Embodiment 14

Figure 14:
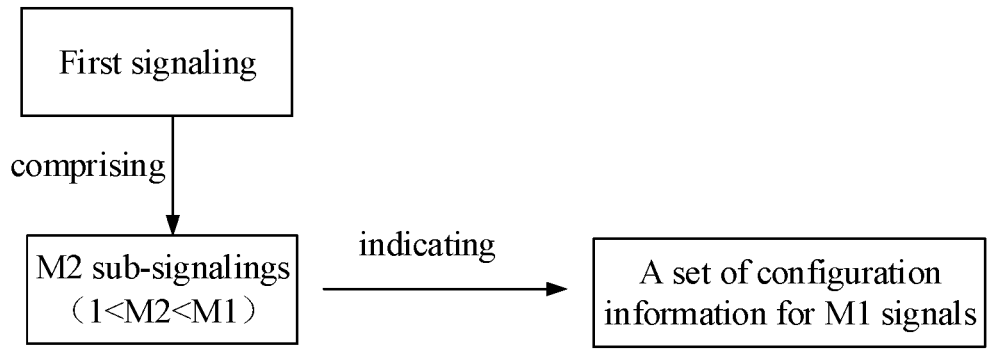
FIG. 14 illustrates a schematic diagram of a relation between a first signaling and M1 signals according to another embodiment of the present disclosure.

Embodiment 14 illustrates a schematic diagram of a relation between a first signaling and M1 signals according to another embodiment of the present disclosure, as shown in FIG. 14.

In embodiment 14, the first signaling comprises M2 sub-signalings, and the M2 sub-signalings are used to indicate a set of configuration information for the M1 signals, M2 being a positive integer greater than 1 and less than M1; any of the M2 sub-signalings is used to indicate configuration information for at least one of the M1 signals, and configuration information for any of the M1 signals is indicated by only one of the M2 sub-signalings.

In one embodiment, a set of configuration information for the M1 signals comprises configuration information for each of the M1 signals.

In one embodiment, the M2 sub-signalings explicitly indicate a set of configuration information for the M1 signals.

In one embodiment, the M2 sub-signalings implicitly indicate a set of configuration information for the M1 signals.

In one embodiment, any of the M2 sub-signalings explicitly indicate configuration information for at least one of the M1 signals.

In one embodiment, any of the M2 sub-signalings implicitly indicate configuration information for at least one of the M1 signals.

Embodiment 15

Figure 15:
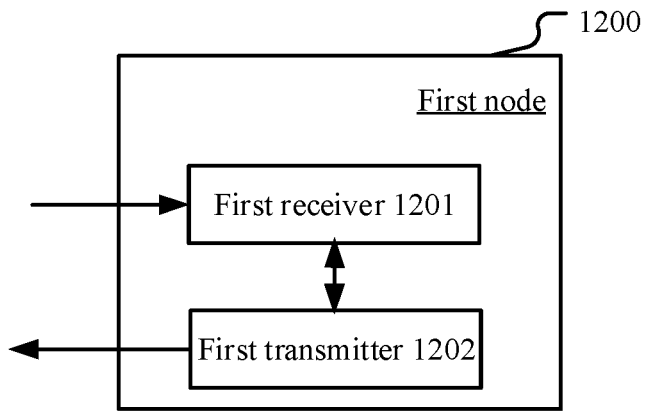
FIG. 15 illustrates a structure block diagram of a processing device in a first node according to one embodiment of the present disclosure.

Embodiment 15 illustrates a structure block diagram of a processing device in a first node, as shown in FIG. 15. In FIG. 15, a processing device 1200 in a first node comprises a first receiver 1201 and a first transmitter 1202.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE that supports V2X communications.

In one embodiment, the first node 1200 is a relay node that supports V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first five of the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first four of the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first three of the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first two of the antenna 452, the transmitter 454, the multi-antenna transmitting processor 457, the transmitting processor 468, the controller/processor 459, the memory 460, and the data source 467 in FIG. 4 of the present disclosure.

The third receiver 1201 receives a first signaling; receives a first signal in a first time window; and the first transmitter 1201 transmits a first bit block in a first radio resource block;

In embodiment 15, the first signaling is used to indicate configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one embodiment, the first bit block comprises a positive integer number of bit sub-block(s), the first bit sub-block being a bit sub-block in the first bit block, any bit sub-block in the first bit block comprises a positive integer number of bit(s); any bit sub-block in the first bit block corresponds to one of the M time windows; the position of the first time window in the M time windows is used to determine a number of bit sub-block(s) comprised in the first bit block.

In embodiment, the first time window is a K-th time window in the M time windows, K being a positive integer not greater than the M; the number of the bit sub-block(s) comprised in the first bit block is equal to the K.

In one embodiment, the size of the first bit block is equal to a product of the size of the first bit sub-block and the number of the bit sub-block(s) comprised in the first bit block.

In one embodiment, the first receiver 1201 also receives M1-1 signal(s) respectively in M1-1 time window(s); wherein M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

In one embodiment, the first signaling comprises M1 sub-signalings, the M1 sub-signalings being respectively used to indicate configuration information for the M1 signals.

In one embodiment, the first receiver 1201 also receives first information; herein, the first information is used to determine M.

Embodiment 16

Figure 16:
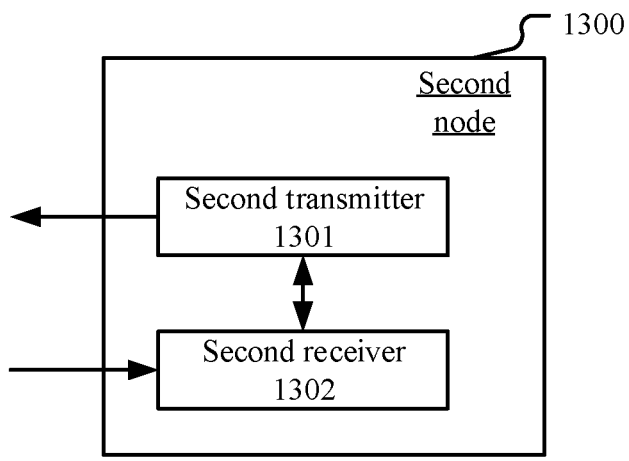
FIG. 16 illustrates a structure block diagram of a processing device in second node according to one embodiment of the present disclosure.

Embodiment 16 illustrates a structure block diagram of a processing device in a second node, as shown in FIG. 16. In FIG. 16, a processing device 1300 of a second node comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first five of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first four of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first three of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first two of the antenna 420, the receiver 418, the multi-antenna receiving processor 472, the receiving processor 470, the controller/processor 475 and the memory 476 in FIG. 4 of the present disclosure.

The second transmitter 1301 transmits a first signaling; and transmits a first signal in a first time window;

the second receiver 1302 receives a first bit block in the first radio resource block;

In embodiment 16, the first signaling is used to indicate configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

In one embodiment, the first bit block comprises a positive integer number of bit sub-block(s), the first bit sub-block being a bit sub-block in the first bit block, any bit sub-block in the first bit block comprises a positive integer number of bit(s); any bit sub-block in the first bit block corresponds to one of the M time windows; the position of the first time window in the M time windows is used to determine a number of bit sub-block(s) comprised in the first bit block.

In one embodiment, the first time window is a K-th time window in the M time windows, K being a positive integer not greater than the M; the number of the bit sub-block(s) comprised in the first bit block is equal to the K.

In one embodiment, the size of the first bit block is equal to a product of the size of the first bit sub-block and the number of the bit sub-block(s) comprised in the first bit block.

In one embodiment, the second transmitter 1301 also transmits M1-1 signal(s) respectively in M1-1 time window(s); herein, M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

In one embodiment, the first signaling comprises M1 sub-signalings, the M1 sub-signalings being respectively used to indicate configuration information for the M1 signals.

In one embodiment, the second receiver 1302 also receives first information; herein, the first information is used to determine M.

In one embodiment, the second transmitter 1301 also transmits first information; herein, the first information is used to determine M.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling; and receiving a first signal in a first time window; and
a first transmitter, transmitting a first bit block in a first radio resource block;
wherein the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

2. The first node according to claim 1, wherein the first bit block comprises a positive integer number of bit sub-block(s), the first bit sub-block being a bit sub-block in the first bit block, any bit sub block in the first bit block comprises a positive integer number of bit(s); any bit sub-block in the first bit block corresponds to one of the M time windows; the position of the first time window in the M time windows is used to determine a number of bit sub-block(s) comprised in the first bit block.

3. The first node according to claim 2, wherein the first time window is a K-th time window in the M time windows, K being a positive integer not greater than the M; the number of the bit sub-block(s) comprised in the first bit block is equal to the K;

or, the size of the first bit block is equal to a product of the size of the first bit sub-block and the number of the bit sub-block(s) comprised in the first bit block;

or, the first time window is a K-th time window in the M time windows, K being a positive integer not greater than the M; the number of the bit sub-block(s) comprised in the first bit block is equal to the K; the size of the first bit block is equal to a product of the size of the first bit sub-block and the number of the bit sub-block(s) comprised in the first bit block.

4. The first node according to claim 1, wherein the first receiver also receives M1-1 signal(s) respectively in M1-1 time window(s); wherein M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

5. The first node according to claim 4, wherein the first signaling comprises M1 sub-signalings, the M1 sub-signalings being respectively used to indicate configuration information for the M1 signals.

6. A second node for wireless communications, comprising:
a second transmitter, transmitting a first signaling; and transmitting a first signal in a first time window; and
a second receiver, receiving a first bit block in a first radio resource block;
wherein the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

7. The second node according to claim 6, wherein the first bit block comprises a positive integer number of bit sub-block(s), the first bit sub-block being a bit sub-block in the first bit block, any bit sub block in the first bit block comprises a positive integer number of bit(s); any bit sub-block in the first bit block corresponds to one of the M time windows; the position of the first time window in the M time windows is used to determine a number of bit sub-block(s) comprised in the first bit block.

8. The second node according to claim 7, wherein the first time window is a K-th time window in the M time windows, K being a positive integer not greater than the M; the number of the bit sub-block(s) comprised in the first bit block is equal to the K;

or, the size of the first bit block is equal to a product of the size of the first bit sub-block and the number of the bit sub-block(s) comprised in the first bit block;

or, the first time window is a K-th time window in the M time windows, K being a positive integer not greater than the M; the number of the bit sub-block(s) comprised in the first bit block is equal to the K; the size of the first bit block is equal to a product of the size of the first bit sub-block and the number of the bit sub-block(s) comprised in the first bit block.

9. The second node according to claim 6, wherein the second transmitter also transmits M1-1 signal(s) respectively in M1-1 time window(s); wherein M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

10. The second node according to claim 9, wherein the first signaling comprises M1 sub-signalings, the M1 sub-signalings being respectively used to indicate configuration information for the M1 signals.

11. A method in a first node for wireless communications, comprising:
receiving a first signaling;
receiving a first signal in a first time window; and
transmitting a first bit block in a first radio resource block;
wherein the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

12. The method according to claim 11, wherein the first bit block comprises a positive integer number of bit sub-block(s), the first bit sub-block being a bit sub-block in the first bit block, any bit sub block in the first bit block comprises a positive integer number of bit(s); any bit sub-block in the first bit block corresponds to one of the M time windows; the position of the first time window in the M time windows is used to determine a number of bit sub-block(s) comprised in the first bit block.

13. The method according to claim 12, wherein the first time window is a K-th time window in the M time windows, K being a positive integer not greater than the M; the number of the bit sub-block(s) comprised in the first bit block is equal to the K;

or, the size of the first bit block is equal to a product of the size of the first bit sub-block and the number of the bit sub-block(s) comprised in the first bit block;

or, the first time window is a K-th time window in the M time windows, K being a positive integer not greater than the M; the number of the bit sub-block(s) comprised in the first bit block is equal to the K; the size of the first bit block is equal to a product of the size of the first bit sub-block and the number of the bit sub-block(s) comprised in the first bit block.

14. The method according to claim 11, comprising:
receiving M1-1 signal(s) respectively in M1-1 time window(s);
wherein M1 signals consist of the first signal and the M1-1 signal(s), and M1 time windows consist of the first time window and the M1-1 time window(s), the M1 signals being respectively transmitted in the M1 time windows;
the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

15. The method according to claim 14, wherein the first signaling comprises M1 sub-signalings, the M1 sub-signalings being respectively used to indicate configuration information for the M1 signals.

16. A method in a second node for wireless communications, comprising:
transmitting a first signaling;
transmitting a first signal in a first time window; and
receiving a first bit block in a first radio resource block;
wherein the first signaling is used for indicating configuration information for the first signal; the first time window is one of M time windows, and any two time windows of the M time windows are orthogonal, M being a positive integer greater than 1; the first radio resource block belongs to a target time window in time domain, and any of the M time windows is associated with the target time window; the first bit block comprises a first bit sub-block, the first bit sub-block being used to indicate whether the first signal is correctly received; a position of the first time window in the M time windows is used to determine a size of the first bit block; the first bit block comprises a positive integer number of bit(s), and the first bit sub-block comprises a positive integer number of bit(s).

17. The method according to claim 16, wherein the first bit block comprises a positive integer number of bit sub-block(s), the first bit sub-block being a bit sub-block in the first bit block, any bit sub-block in the first bit block comprises a positive integer number of bit(s); any bit sub-block in the first bit block corresponds to one of the M time windows; the position of the first time window in the M time windows is used to determine a number of bit sub-block(s) comprised in the first bit block.

18. The method according to claim 17, wherein the first time window is a K-th time window in the M time windows, K being a positive integer not greater than the M; the number of the bit sub-block(s) comprised in the first bit block is equal to the K;
or, the size of the first bit block is equal to a product of the size of the first bit sub-block and the number of the bit sub-block(s) comprised in the first bit block;
or, the first time window is a K-th time window in the M time windows, K being a positive integer not greater than the M; the number of the bit sub-block(s) comprised in the first bit block is equal to the K; the size of the first bit block is equal to a product of the size of the first bit sub-block and the number of the bit sub-block(s) comprised in the first bit block.

19. The method according to claim 16, comprising:
transmitting M1-1 signal(s) respectively in M1-1 time window(s);
wherein M1 signals consist of the first signal and the M1-1 signal(s), and M1 time windows consist of the first time window and the M1-1 time window(s), the M1 signals being respectively transmitted in the M1 time windows; the M1 time windows are M1 different time windows in the M time windows, the first time window is a latest one of the M1 time windows, M1 being a positive integer greater than 1 and not greater than M; M1 bit sub-blocks are respectively used for indicating whether the M1 signals are correctly received, the first bit sub-block being one of the M1 bit sub-blocks, the first bit block comprising the M1 bit sub-blocks.

20. The method according to claim 19, wherein the first signaling comprises M1 sub-signalings, the M1 sub-signalings being respectively used to indicate configuration information for the M1 signals.

* * * * *